No. 675,164. Patented May 28, 1901.
T. R. PALMER & F. X. BERRODIN.
PNEUMATIC TIRE AND METHOD OF MAKING SAME.
(Application filed Dec. 10, 1900.)
(No Model.)
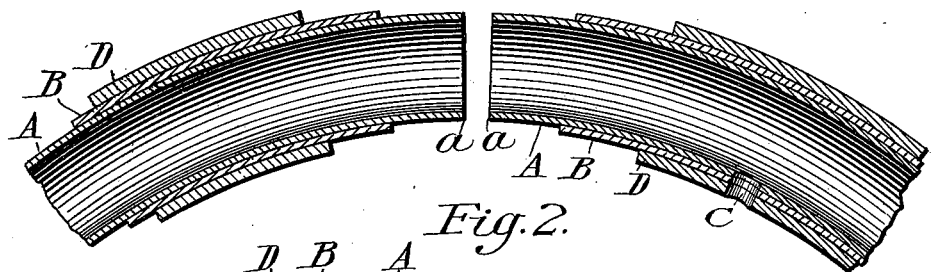
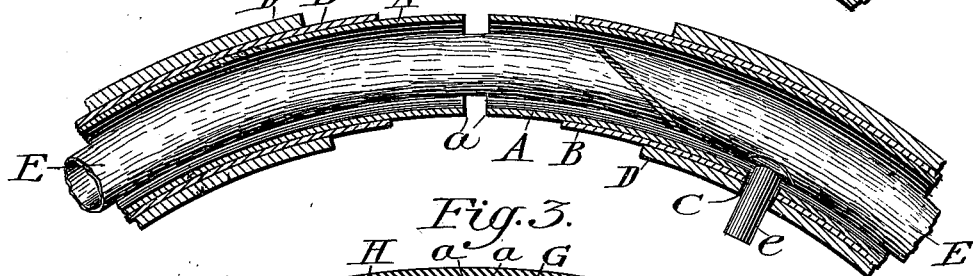
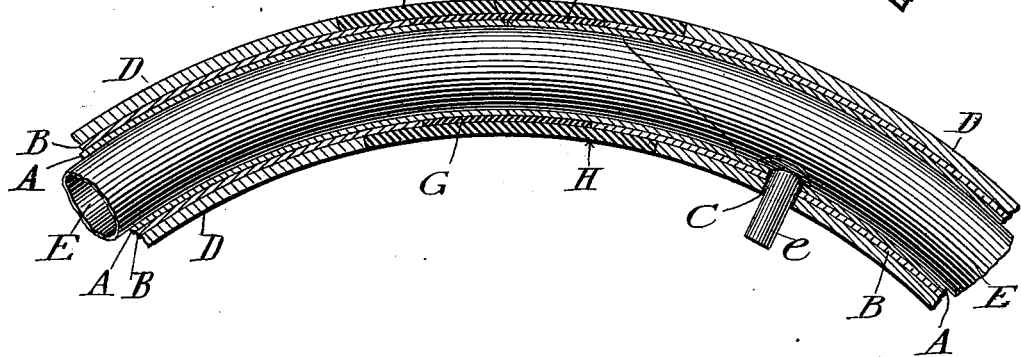
Witnesses:
Inventors.
Theron R. Palmer.
Frank X. Berrodin.
By _____ Atty.

UNITED STATES PATENT OFFICE.

THERON R. PALMER AND FRANK X. BERRODIN, OF ERIE, PENNSYLVANIA, ASSIGNORS TO PENNSYLVANIA RUBBER COMPANY, OF SAME PLACE.

PNEUMATIC TIRE AND METHOD OF MAKING SAME.

SPECIFICATION forming part of Letters Patent No. 675,164, dated May 28, 1901.

Application filed December 10, 1900. Serial No. 39,397. (No model.)

*To all whom it may concern:*

Be it known that we, THERON R. PALMER and FRANK X. BERRODIN, citizens of the United States, residing at Erie, in the county of Erie and State of Pennsylvania, have invented certain new and useful Improvements in Pneumatic Tires and Methods of their Manufacture; and we do hereby declare the following to be a full, clear, and exact description of the invention, such as will enable others skilled in the art to which it appertains to make and use the same, reference being had to the accompanying drawings, and to the letters of reference marked thereon, forming part of this specification.

Our invention relates to pneumatic tires and methods of manufacturing the same, and enables us to make a tire of this character rapidly and economically and with a separate inner tube therein, so that the whole may be vulcanized at a single operation, and at the same time, if necessary, the inner tube can be at any time removed therefrom, if desired.

Heretofore in the manufacture of single-tube or hose-pipe tires the tire has been made of a rubber tube or lining surrounded with one or more layers of fabric and rubber until sufficiently strong, and the ends of the tire so formed were then joined together and the tire placed in a mold, after which air or a small quantity of water was inserted into the tire, which the heat during the process of vulcanizing expanded so as to force the tire outward into contact with the mold; and in the manufacture of double-tube tires ordinarily the tire is constructed and vulcanized in the same manner as hereinbefore described, and after it is so completed a short slit is made in its inner surface and a removable inner tube inserted in the tire and the slit then laced up. This method of making both single and double tube tires is the only one in practical use except the method of making double-tube tires by molding them on a sectional mandrel, which is afterward removed in sections through a slit made therefor in the tire, which slit is afterward utilized for the insertion of the inner tube therein; but this method of making tires can only be utilized in making double-tube tires, and while in making double-tube tires by this method the inner lining of rubber can be dispensed with it is a much more expensive method of making tires than where air or water is used to expand the tire in the mold during the process of vulcanization.

The object of our invention is the construction and vulcanizing of pneumatic tires by utilizing the ordinary method of expanding air or water therein during the process of vulcanization, without having to construct the tire either on an annular mandrel or with a permanent inner lining of rubber, as is now universally done when pneumatic tires are made, and to accomplish this end we construct our tire-sheath upon a mandrel of layers of fabric and rubber in the usual way, but without an inner layer or lining of rubber, and after the tire is so formed and removed from the mandrel, before the ends thereof are brought together and spliced, we insert therein a loose inner tube, either made with closed ends or completed by joining its ends temporarily together, so as to form a continuous inner tube thereof. This inner tube before it is inserted in the tire has its outer surface coated with soapstone or other suitable material to prevent its adhering to the fabric forming the inner surface of the tire during the process of vulcanization, and the inner tube may also, if desired, be partially vulcanized before it is placed in the tire. This inner tube is also provided with an ordinary valve-stem, which projects out through a suitable opening in the tire. After this inner tube is so inserted in the tire the ends of the tire are then brought together and the joint spliced in the ordinary manner, so as to form a complete annular tire-sheath with a loose inner air-tube therein. The tire is then placed in the vulcanizing-mold and expanded therein by inflating the inner tube in the usual manner, and the process of vulcanization is then carried out. In this manner we are enabled to vulcanize all of the layers of fabric and rubber composing the tire and the splice joining the ends thereof together into an integral structure and at the same time vulcanize or complete the vulcanization of the partially-vulcanized loose inner tube therein. It will readily be seen that by this process of construction we are enabled to dispense entirely with the inner lining of rubber, without which single-tube tires cannot be made by any of the methods of manufacture now in use or double-tube tires made unless made on a sectional mandrel, as hereinbefore referred to, and by thus doing away with the inner rubber lining of the tire (useful in the double-tube tire only during the process of vulcanization) we so materially reduce the weight of the tire that a double-tube tire can be made by our process that is practically as light and resilient as the ordinary single-tube tire, and in case the tire is at any time injured the inner tube can be removed from the tire through a slit made therefor and repaired, or a new one inserted, if desired.

Our invention is hereinafter fully explained, described, and illustrated in the accompanying drawings, in which—

Figure 1 is a sectional view of a portion of a pneumatic tire embodying our invention before the ends are joined. Fig. 2 is a sectional view of a portion of a pneumatic tire after the loose inner tube is inserted and with the ends of the sheath ready to be joined and spliced together. Fig. 3 is a like view of the same after the ends of the tire or sheath are joined together with a loose closed-ended tube therein.

In the drawings thus illustrating our invention we have not shown a full tire nor the air-valve, as it is understood that a suitable valve will be applied to the stem connected with the loose inner tube and extending out through an opening in the tire therefor.

In carrying out our invention we build up the tire by first placing on the mandrel a layer of fabric A, having its outer surface coated with a coating of rubber. Over this layer we place another layer B of fabric having a coating of rubber on both sides thereof, this layer B, however, not extending quite to the ends of the layer A, and over the layer B we place an outer layer of rubber or other suitable covering D, not, however, extending quite to the ends of the layer B. We may, however, if desired, use a greater or less number of layers of material in building up the tire, if desired. When the tire is thus built up, we remove it from the mandrel and make a hole C therein for the reception of the valve-stem $e$, secured to a loose inner tube E. This loose inner tube E is preferably made of thin elastic rubber and coated on its outer surface with soapstone or other suitable material to prevent its adherence to the inner layer A of the tire during the process of vulcanization. This inner tube E, having its ends closed or its ends joined so as to be separable when desired, is then inserted in the sheath of the tire, which is then bent around so as to bring the ends $a\ a$ of the inner layer A of the sheath together. Then one or more strips of cloth G with rubber on both surfaces thereof is wrapped around the joint formed by the ends $a\ a$ of the layer A, so as to fill the space between the ends of the layer B. Then a strip of outer covering H of sufficient width to fill the space between the ends of the layer D of the sheath is wrapped around the tire, completely closing and securing the joint between the ends thereof. The tire is then placed in a vulcanizing-mold, and the inner tube E is preferably inflated with air, which operates to drive the air in the tire between the outer surface of the inner tube and the inner surface of the layer A of the tire-sheath out through the opening C in the tire and expand the tire out, so as to fill the mold. The valve-stem $e$ is then secured and the tire submitted to heat in the usual manner for vulcanization, which vulcanization is simultaneous both in the tire and in the loose inner tube therein. When the tire is thus completed, it can be used either as a single or double tube tire with equal facility. In case it is desired to use it specifically as a double-tube tire a slit can be made in the tire, with eyelet-holes at each side thereof, and the slit laced up in the usual manner, and the inner tube E can then be removed and replaced when desired, and when utilized as a single-tube tire if at any time it is injured a slit can be made in the tire and the inner tube removed, repaired, and replaced or a new inner tube placed therein, as may be desired.

Having thus described our invention, so as to enable others to utilize the same, what we claim as new, and desire to secure by Letters Patent of the United States, is—

1. A method of making pneumatic tires, consisting substantially of making a tube or sheath of layers of fabric and rubber, inserting a loose rubber inner air-tube therein before the ends of the tube or sheath are brought together and spliced to form a tire, and then placing the tire in a vulcanizing-mold and expanding the loose inner air-tube therein, and then vulcanizing the tire, substantially as set forth.

2. A method of making pneumatic tires, consisting substantially, of building up on a mandrel, a tube or sheath of alternate layers of fabric and rubber without an inner layer or lining of rubber, then removing the tube or sheath so built up, from the mandrel, and inserting a loose elastic closed-ended inner air-tube therein before the ends of the built-up tube or sheath are brought together and spliced to form a tire, then placing the tire in a vulcanizing-mold and expanding the inner tube therein and vulcanizing both the tire and the loose inner tube therein, substantially as set forth.

3. The combination in a pneumatic tire, of a seamless annular tube vulcanized together so as to form a tire-sheath, with a loose closed-ended inner air-tube within said tire-sheath, substantially as set forth.

4. The combination in a pneumatic tire, of a tube or sheath made of fabric and rubber, and a loose elastic separable-ended inner air-tube inserted into the tube or sheath before the ends thereof are joined together into a tire and vulcanized, substantially as set forth.

5. The combination in a pneumatic tire, of a tube or sheath built up of an inner layer of friction-cloth and other layers of fabric and rubber, with a loose elastic closed-ended rubber inner air-tube coated on its outer surface with soapstone or other material of like nature, inserted into the tube or sheath before the ends thereof are joined together and vulcanized, substantially as set forth.

In testimony whereof we affix our signatures in presence of two witnesses.

THERON R. PALMER.
FRANK X. BERRODIN.

Witnesses:
H. M. STURGEON,
M. H. SAWDEY.